United States Patent
Gross et al.

(10) Patent No.: US 7,391,835 B1
(45) Date of Patent: Jun. 24, 2008

(54) OPTIMIZING SYNCHRONIZATION BETWEEN MONITORED COMPUTER SYSTEM SIGNALS

(75) Inventors: Kenny C. Gross, San Diego, CA (US); Yujuan Bao, Beijing (CN)

(73) Assignee: Sun Microsystems, Inc., Santa Clara, CA (US)

( * ) Notice: Subject to any disclaimer, the term of this patent is extended or adjusted under 35 U.S.C. 154(b) by 729 days.

(21) Appl. No.: 10/955,195

(22) Filed: Sep. 29, 2004

(51) Int. Cl.
*H04L 7/00* (2006.01)
(52) U.S. Cl. .................... 375/354; 709/248; 713/375
(58) Field of Classification Search ............... 375/354; 709/248; 713/375
See application file for complete search history.

(56) References Cited

U.S. PATENT DOCUMENTS

| | | | | |
|---|---|---|---|---|
| 4,937,763 A | 6/1990 | Mott | ........................... | 364/550 |
| 6,032,167 A * | 2/2000 | Takatsu | ...................... | 708/424 |

* cited by examiner

*Primary Examiner*—Mohammed Ghayour
*Assistant Examiner*—Juan Alberto Torres
(74) *Attorney, Agent, or Firm*—Park, Vaughan & Fleming LLP; Shun Yao

(57) ABSTRACT

One embodiment of the present invention provides a system that optimizes synchronization between monitored signals in a computer system. During operation, the system receives a number of monitored signals. The system then forms a number of signal pairs by grouping each signal with every other signal. Next, the system optimizes synchronization between the signals by iteratively perturbing the timing of each signal in an attempt to increase the value of an objective function which reflects the overall synchronization between all the signals.

24 Claims, 4 Drawing Sheets

OPTIMIZING SYNCHRONIZATION BETWEEN MONITORED COMPUTER SYSTEM SIGNALS

BACKGROUND

1. Field of the Invention

The present invention relates to techniques for enhancing the reliability of computer systems. More specifically, the present invention relates to a method and an apparatus for optimizing synchronization between monitored signals within a computer system.

2. Related Art

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is critically important to ensure high availability in such enterprise computing systems.

To achieve high availability in enterprise computing systems, it is necessary to be able to capture unambiguous diagnostic information that can quickly pinpoint the source of defects in hardware or software. If systems have too little event monitoring, when problems crop up at a customer site, service engineers may be unable to quickly identify the source of the problem. This can lead to increased down time, which can adversely impact customer satisfaction and loyalty.

Fortunately, high-end computer servers, such as those manufactured by SUN Microsystems, Inc. of Santa Clara, Calif., are now equipped with over 1000 sensors that measure variables such as temperature, voltage, current, vibration, and acoustics. Furthermore, software-based monitoring mechanisms monitor system performance parameters such as processor load, memory and cache usage, system throughput, queue lengths, I/O traffic, quality of service, security, etc. In addition, many high-end computer servers have embedded diagnostic systems and online statistical process control techniques that collect and analyze process variables in real time. For example, SUN Microsystems, Inc. is developing a variety of tools for monitoring high-end servers.

These monitoring tools provide proactive fault monitoring based on telemetry signals. However, in many high-end servers, the monitored signals are non-synchronous. Processes can speed up and slow down depending on many factors. Over time, signals generated by different processes can drift even further out of synchronization, which can greatly complicate the process of correlating the signals. This is problematic because most types of statistical pattern recognition mechanisms require input data streams to be synchronized.

Hence, what is needed is a method and an apparatus for optimizing synchronization between the telemetry signals from a computer system.

SUMMARY

One embodiment of the present invention provides a system that optimizes synchronization between monitored signals in a computer system. During operation, the system receives a number of monitored signals. The system then forms a number of signal pairs by grouping each signal with every other signal. Next, the system optimizes synchronization between the signals by iteratively perturbing the timing of each signal in an attempt to increase the value of an objective function which reflects the overall synchronization between all the signals.

In a variation of this embodiment, perturbing the timing of a signal involves generating a random lag or lead time, and shifting the timing of the signal with the random lag or lead time.

In a further variation, the objective function is the root-mean-square of the cross-correlation coefficients of all the signal pairs. In computing the objective function, the system first computes a cross-correlation coefficient between each signal and every other signal, and then computes the root-mean-square of all the cross-correlation coefficients. Finally, the system compares the pre-perturbation and post-perturbation values of the objective function.

In a further variation, if the perturbation increases the value of the objective function, the system retains the lag or lead time applied to the signal. If the perturbation decreases the value of the objective function, the system discards the perturbation and reverts the signal to its state prior to the perturbation.

In a variation of this embodiment, the system stops the iterative perturbation process if the difference of the values of the objective function between two consecutive iterations is less than a pre-determined value.

In a variation of this embodiment, the system stops the iterative perturbation process if the value of the objective function does not change after a pre-determined number of iterations.

In a further variation, after stopping the iterative perturbation process, the system applies an additional random lag or lead time to each signal to ensure that a substantial optimal synchronization between all the signals has been attained.

In a variation of this embodiment, the system selects one of the received signals to be an anchor signal, wherein the anchor signal is not perturbed.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
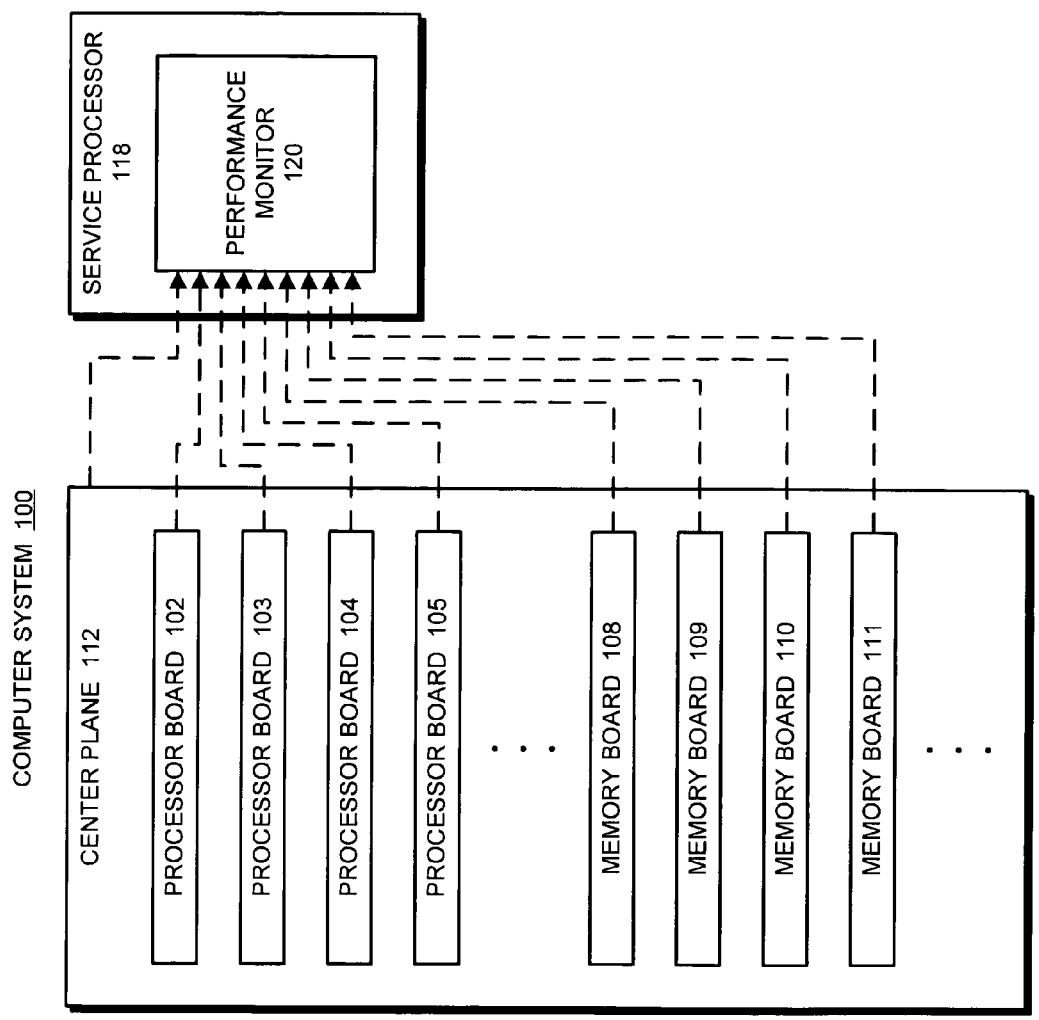
FIG. 1 illustrates a computer system which includes a service processor for monitoring telemetry signals.

FIG. 1 illustrates a computer system 100 which includes a service processor for processing telemetry signals. As is illustrated in FIG. 1, computer system 100 includes a number of processor boards 102-105 and a number of memory boards 108-111, which communicate with each other through center plane 112.

In the example shown in FIG. 1, these system components are implemented as field replaceable units (FRUs), which are independently monitored. Note that all major system units, including both hardware and software, can be decomposed into FRUs. For example, a software FRU can include an operating system, a middleware component, a database, or an application.

Computer system 100 is associated with a service processor 118, which can reside within computer system 100, or alternatively can reside in a standalone unit separate from computer system 100. Within service processor 118, a performance monitor 120 receives telemetry signals from a number of sensors which report values of different variables, such as temperature, voltage, current, vibration, acoustics, etc. These telemetry signals may also include software-based performance parameters, such as processor load, memory/cache usage, system throughput, queue lengths, I/O traffic, quality of service, security, etc. Based on these received telemetry signals, service processor 118 performs a number of diagnostic functions for computer system 100 and determines whether computer system 100 or any of its components are in a degraded state. As is shown in FIG. 1, performance monitor 120 receives telemetry signals from center plane 112, processor boards 102-105, and memory boards 108-111. Alternatively, these performance-monitoring signals can traverse a network and reach a remote monitoring center (not shown).

Although the present invention is described in the context of a server computer system 100 with multiple processor boards and an associated service processor 118, the present invention is not meant to be limited to such a server computer system. In general, the present invention can be applied to any type of computer system, with or without a service processor 118. This includes, but is not limited to, a computer system based on a microprocessor, a mainframe computer, a digital signal processor, a portable computing device, a personal organizer, a device controller, and a computational engine within an appliance.

Telemetry Signal Synchronization

Figure 2:
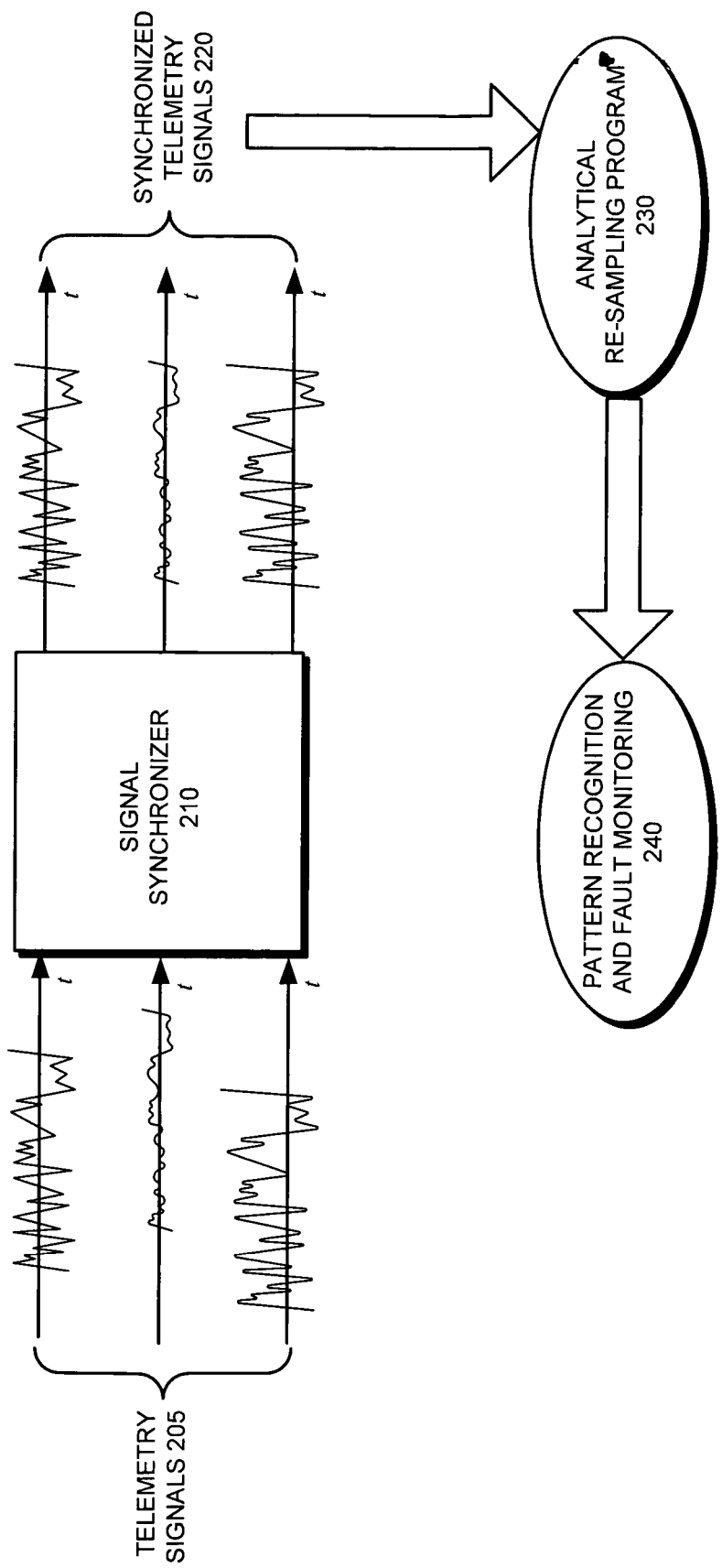
FIG. 2 illustrates the process of optimizing synchronization between telemetry signals from a computer system in accordance with an embodiment of the present invention.

FIG. 2 illustrates the process of optimizing synchronization between telemetry signals from a computer system in accordance with an embodiment of the present invention. Telemetry signals 205 received by a system can be out of synchronization with one another. Note that fault location and diagnosis mechanisms typically apply pattern recognition approaches to these telemetry signals to detect any system anomaly. However, if these signals are out of synchronization with one another, it is difficult for a pattern recognition mechanism to function properly.

To facilitate accurate pattern recognition, telemetry signals 205 are synchronized with one another. One embodiment of the present invention uses a signal synchronizer 210, which aligns the input telemetry signals 205 so that they become substantially synchronized with each other. Synchronized telemetry signals 220 are then sent to an analytical re-sampling program 230 which re-samples the signals so that they have uniform sampling intervals. The outputs of analytical re-sampling program 230 are then fed into pattern recognition and fault monitoring mechanism 240 to detect anomalies in system performance which may be indicative of an impending system failure.

To synchronize out-of-synchronization telemetry signals 205, one could use a brute force approach, which involves performing massive cross-correlation analysis on the signals and exhaustively trying all possible lag/lead times between the signals. However, the cost of such a solution becomes prohibitively highly when there are a large number of telemetry signals.

One embodiment of the present invention uses a genetic-algorithm technique which operates by iteratively perturbing the synchronization between the telemetry signals. During the synchronization process, the system evaluates cross-correlation coefficients between all possible signal pairs. A cross-correlation coefficient between two signals generally represents how closely the timing of two signals are correlated with each other. The objective of the synchronization process is generally to maximize the absolute value of cross-correlation coefficients between signals. One may define an objective function as the root-mean-square of all the cross-correlation coefficients of all the signal pairs, and may maximize the value of the objective function through an iterative perturbation process.

During each iteration, the system imposes a time-shift perturbation to each signal. This perturbation can be a randomly generated lag or lead time. (Note that one may limit the range of the random lag/lead time to control the computational complexity.) If the perturbation increases the value of the objective function, the perturbation is retained. If the perturbation does not increase the value of the objective function, the perturbation is discarded.

The system may stop the iterative perturbation process when certain conditions are met. One approach is to set a threshold, τ, on successive improvements to the objective function. The iterative process stops when the objective function improvements become smaller than r. Another approach is to stop the iterative process when there are no changes in the value of the objective function after a number of iterations. After the process is stopped, the system can further ensure that the synchronization is substantially optimal by imposing another round of perturbation to the signals in the final configuration, and can determine whether any further adjustments can be made. If the system has attained a substantially optimal synchronization, each of these perturbations to the final configuration would produce a diminution in the objective function value.

Figure 3:
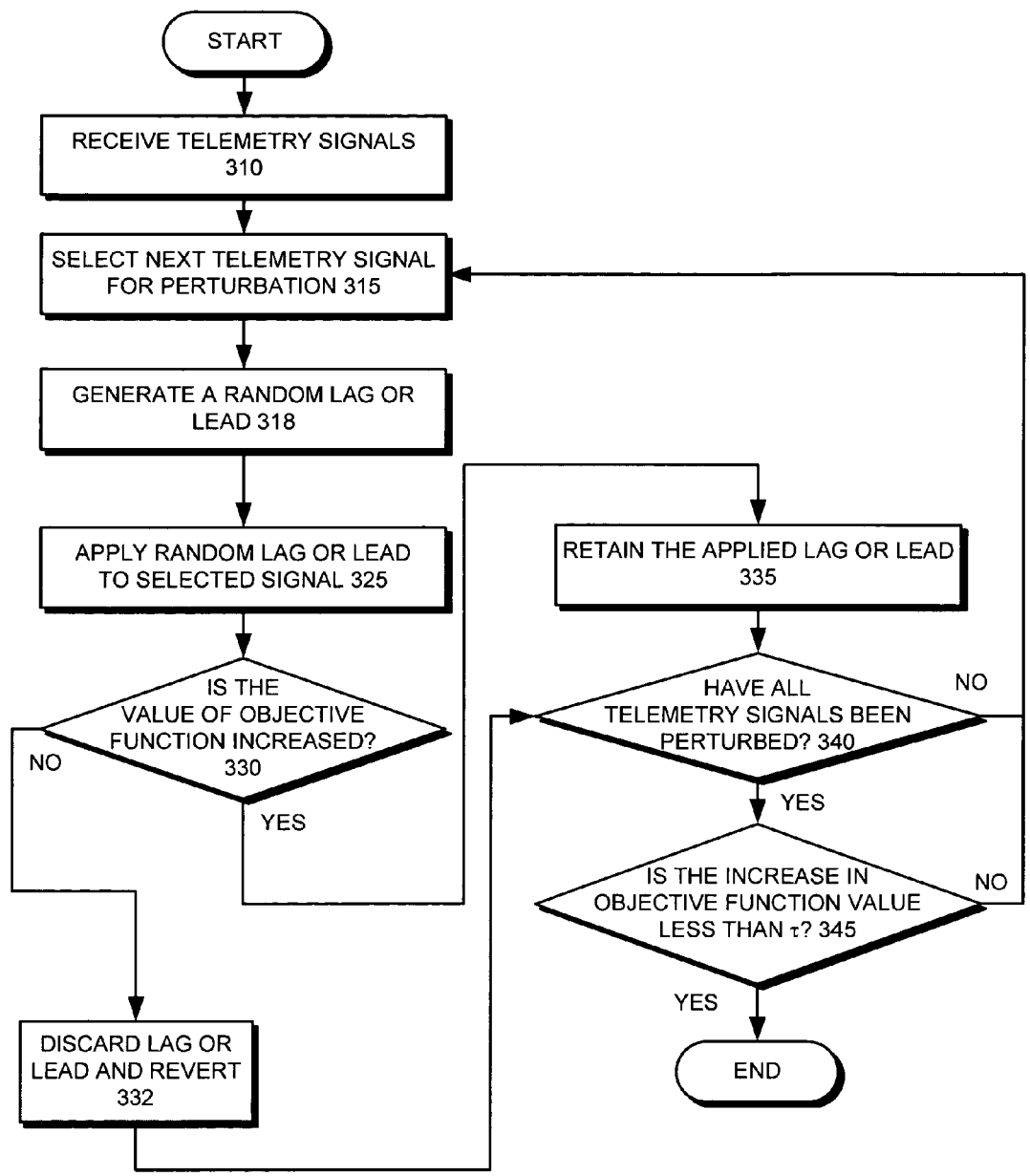
FIG. 3 presents a flow chart illustrating the process of synchronizing telemetry signals using an iterative perturbation technique in accordance with an embodiment of the present invention.

FIG. 3 presents a flow chart illustrating the process of synchronizing telemetry signals using an iterative perturbation technique in accordance with an embodiment of the present invention. The system starts by receiving a number of telemetry signals (step 310). The system then selects a telemetry signal for perturbation (step 315). Next, the system generates a random lag or lead time as the perturbation (step 318), and applies the perturbation to the selected signal (step 325).

After applying the perturbation to the selected signal, the system determines whether the value of the objective function has increased. If so, the applied lag or lead time is retained (step 335). If not, the perturbation is discarded and the perturbed signal is reverted to its state prior to the perturbation (step 332). The system then determines whether all the telemetry signals have been perturbed in the current iteration (step 340). If there are still telemetry signals that have not been perturbed during the current iteration, the system continues to select the next signal for perturbation (step 315). If all the signals have been perturbed in the current iteration, the system determines whether the overall increase in the value of the objective function from the current iteration is less than a pre-determined value τ (step 345). If this condition is met, the synchronization process is complete. Otherwise, the system enters another iteration (step 315).

Illustrative Results

Figure 4A:
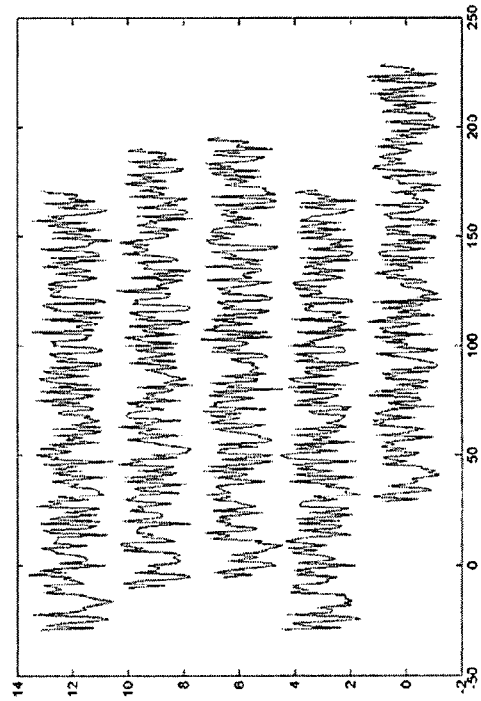
FIG. 4A illustrates five exemplary signals from correlated physical processes which are inputs to the synchronization process in accordance with an embodiment of the present invention.
Figure 4B:
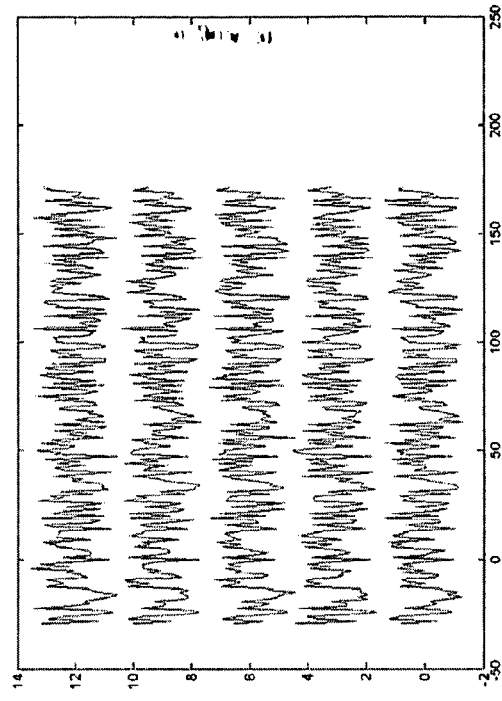
FIG. 4B illustrates the time shift of the five exemplary signals after one iteration in accordance with an embodiment of the present invention.
Figure 4C:
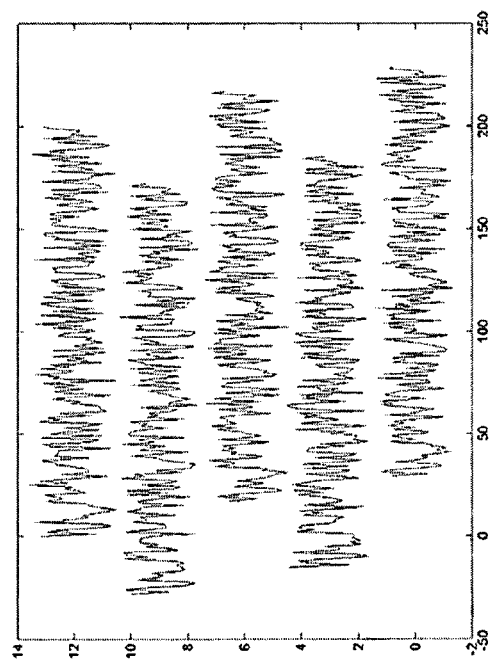
FIG. 4C illustrates the time shift of the five exemplary signals after seven iterations in accordance with an embodiment of the present invention.

FIG. 4A illustrates five exemplary signals from correlated physical processes which are inputs to the synchronization process in accordance with an embodiment of the present invention. As shown in FIG. 4A, the five signals appear to be out of synchronization with one another, and there seems to be little correlation between any two signals. FIG. 4B illustrates the time shift of the five example signals after one iteration in accordance with an embodiment of the present invention. FIG. 4C illustrates the time shift of the five example signals after seven iterations in accordance with an embodiment of the present invention. It can be observed that through more iterations, the five signals are progressively shifted toward synchronized positions.

Figure 4D:
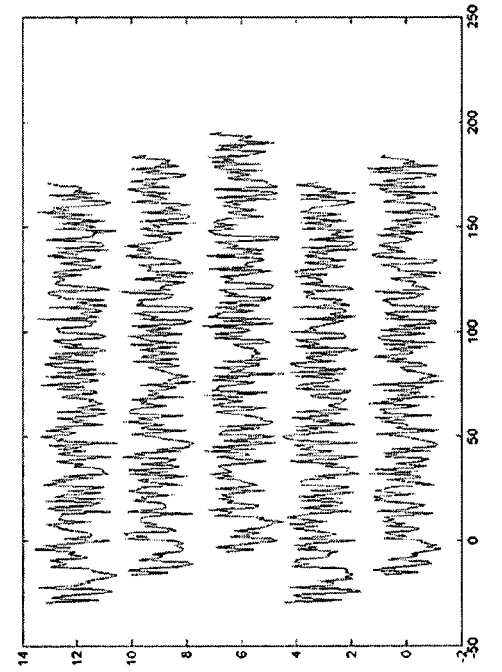
FIG. 4D illustrates the time shift of the five exemplary signals which are substantially synchronized after fifteen iterations in accordance with an embodiment of the present invention.

FIG. 4D illustrates the time shift of the five exemplary signals which are substantially synchronized after fifteen iterations in accordance with an embodiment of the present invention. In general, the iteration process converges and reaches a substantially optimal synchronization of the signals within tens of iterations. Note that the reduction in computational intensity achieved by the present invention is significant compared with that of the brute force approach.

For example, suppose there are eight signals to be synchronized, and the time shift window size is nine time units. Also, assume that the iterative perturbation process converges within 30 iterations. The system can attain substantially synchronized signals after at most 30×8=240 perturbations and cross-correlation computations. Whereas, using the brute force approach, the system would perform $(8-1)^9=40,353,607$ cross-correlation computations.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for optimizing synchronization between monitored signals in a computer system, comprising:
   receiving a number of monitored signals;
   forming a number of signal pairs by grouping each signal with every other signal; and
   optimizing synchronization between the signals by iteratively perturbing the timing of each signal in an attempt to increase the value of an objective function which reflects the overall synchronization between all the signals.

2. The method of claim 1, wherein perturbing the timing of a signal involves generating a random lag or lead time, and shifting the timing of the signal with the random lag or lead time.

3. The method of claim 2,
   wherein the objective function is the root-mean-square of the cross-correlation coefficients of all the signal pairs; and
   wherein the method further comprises:
      computing the value of the objective function, which involves:
         computing a cross-correlation coefficient between each signal and every other signal; and
         computing the root-mean-square of all the cross-correlation coefficients; and
      comparing the pre-perturbation and post-perturbation values of the objective function.

4. The method of claim 2, wherein when the perturbation increases the value of the objective function, the method further comprises retaining the lag or lead time applied to the signal; and
   wherein when the perturbation decreases the value of the objective function, the method further comprises discarding the perturbation and reverting the signal to its state prior to the perturbation.

5. The method of claim 1, further comprising stopping the iterative perturbation process when the difference of the values of the objective function between two consecutive iterations is less than a pre-determined value.

6. The method of claim 1, further comprising stopping the iterative perturbation process when the value of the objective function does not change after a pre-determined number of iterations.

7. The method of claim 6, further comprising applying an additional random lag or lead time to each signal after stopping the iterative perturbation process to ensure that a substantially optimal synchronization between all the signals has been attained.

8. The method of claim 1, further comprising selecting one of the received signals to be an anchor signal, wherein the anchor signal is not perturbed.

9. A computer-readable storage medium storing instructions that when executed by a computer cause the computer to perform a method for optimizing synchronization between monitored signals in a computer system, the method comprising:
   receiving a number of monitored signals;
   forming a number of signal pairs by grouping each signal with every other signal; and
   optimizing synchronization between the signals by iteratively perturbing the timing of each signal in an attempt to increase the value of an objective function which reflects the overall synchronization between all the signals.

10. The computer-readable storage medium of claim 9, wherein perturbing the timing of a signal involves generating a random lag or lead time, and shifting the timing of the signal with the random lag or lead time.

11. The computer-readable storage medium of claim 10,
    wherein the objective function is the root-mean-square of the cross-correlation coefficients of all the signal pairs; and
    wherein the method further comprises:
       computing the value of the objective function, which involves:

computing a cross-correlation coefficient between each signal and every other signal; and computing the root-mean-square of all the cross-correlation coefficients; and comparing the pre-perturbation and post-perturbation values of the objective function.

12. The computer-readable storage medium of claim 10, wherein when the perturbation increases the value of the objective function, the method further comprises retaining the lag or lead time applied to the signal; and wherein when the perturbation decreases the value of the objective function, the method further comprises discarding the perturbation and reverting the signal to its state prior to the perturbation.

13. The computer-readable storage medium of claim 9, wherein the method further comprises stopping the iterative perturbation process when the difference of the values of the objective function between two consecutive iterations is less than a pre-determined value.

14. The computer-readable storage medium of claim 9, wherein the method further comprises stopping the iterative perturbation process when the value of the objective function does not change after a pre-determined number of iterations.

15. The computer-readable storage medium of claim 14, wherein the method further comprises applying an additional random lag or lead time to each signal after stopping the iterative perturbation to ensure that a substantially optimal synchronization between all the signals has been attained.

16. The computer-readable storage medium of claim 9, wherein the method further comprises selecting one of the received signals to be an anchor signal, wherein the anchor signal is not perturbed.

17. An apparatus for optimizing synchronization between monitored signals in a computer system, comprising:

a receiving mechanism configured to receive a number of monitored signals;

a grouping mechanism configured to form a number of signal pairs by grouping each signal with every other signal; and an optimization mechanism configured to optimize synchronization between the signals by iteratively perturbing the timing of each signal in an attempt to increase the value of an objective function which reflects the overall synchronization between all the signals.

18. The apparatus of claim 17, wherein while perturbing the timing of a signal, the optimization mechanism is configured to generate a random lag or lead time, and to shift the timing of the signal with the random lag or lead time.

19. The apparatus of claim 18, wherein the objective function is the root-mean-square of the cross-correlation coefficients of all the signal pairs; and wherein the optimization mechanism is further configured to:

compute a cross-correlation coefficient between each signal and every other signal;

compute the root-mean-square of all the cross-correlation coefficients; and to compare the pre-perturbation and post-perturbation values of the objective function.

20. The apparatus of claim 18, wherein when the perturbation increases the value of the objective function, the optimization mechanism is further configured to retain the lag or lead time applied to the signal; and wherein when the perturbation decreases the value of the objective function, the optimization mechanism is further configured to discard the perturbation and to revert the signal to its state prior to the perturbation.

21. The apparatus of claim 17, wherein the optimization mechanism is further configured to stop the iterative perturbation process when the difference of the values of the objective function between two consecutive iterations is less than a pre-determined value.

22. The apparatus of claim 17, wherein the optimization mechanism is further configured to stop the iterative perturbation process when the value of the objective function does not change after a pre-determined number of iterations.

23. The apparatus of claim 22, wherein the optimization mechanism is further configured to apply an additional random lag or lead time to each signal after stopping the iterative perturbation process to ensure that a substantially optimal synchronization between all the signals has been attained.

24. The apparatus of claim 17, wherein the optimization mechanism is further configured to select one of the received signals to be an anchor signal, wherein the anchor signal is not perturbed.

* * * * *